(12) United States Patent
Cai et al.

(10) Patent No.: US 11,754,595 B2
(45) Date of Patent: Sep. 12, 2023

(54) METHOD FOR CALIBRATING LINEAR VIBRATION AND ANGULAR VIBRATION BASED ON MONOCULAR VISION

(71) Applicants: National Institute of Metrology, China, Beijing (CN); Guizhou University, Guiyang (CN)

(72) Inventors: Chenguang Cai, Beijing (CN); Ming Yang, Guiyang (CN); Zhihua Liu, Beijing (CN); Qi Lyu, Beijing (CN); Wenfeng Liu, Guiyang (CN); Ping Yang, Beijing (CN)

(73) Assignees: National Institute of Metrology, China, Beijing (CN); Guizhou University, Guiyang (CN)

( * ) Notice: Subject to any disclaimer, the term of this patent is extended or adjusted under 35 U.S.C. 154(b) by 0 days.

(21) Appl. No.: 17/555,779

(22) Filed: Dec. 20, 2021

(65) Prior Publication Data
US 2022/0113333 A1  Apr. 14, 2022

(30) Foreign Application Priority Data
Nov. 15, 2021  (CN) .......................... 202111350564.4

(51) Int. Cl.
*G01P 21/00* (2006.01)
(52) U.S. Cl.
CPC .................... *G01P 21/00* (2013.01)

(58) Field of Classification Search
CPC ...................................................... G01P 21/00
See application file for complete search history.

(56) References Cited

FOREIGN PATENT DOCUMENTS

| CN | 104180818 A | 12/2014 | |
|---|---|---|---|
| CN | 108846857 A | 11/2018 | |
| CN | 110702946 A * | 1/2020 | ............. G01P 21/00 |
| CN | 109712157 B * | 11/2020 | |

OTHER PUBLICATIONS

Machine translation of CN 110702946 (Year: 2020).*

* cited by examiner

*Primary Examiner* — Walter L Lindsay, Jr.
*Assistant Examiner* — Andrew V Do

(57) ABSTRACT

A method for calibrating linear vibration and angular vibration based on monocular vision. A motion sequence image of a feature mark is acquired by an industrial camera, and an output signal of a linear and angular accelerometer is acquired by a data acquisition card, where the feature mark and the linear and angular accelerometer are fixed on a work table. An exciting acceleration of the linear and angular accelerometer is measured by a monocular vision method integrating a camera calibration method and a sub-pixel edge extraction method based on line segment detection. The exciting acceleration and the output signal are fitted by a sine approximation method, respectively, and corresponding fitted peaks are obtained. A sensitivity of the linear and angular accelerometer is obtained according to the fitted peaks.

4 Claims, 3 Drawing Sheets

METHOD FOR CALIBRATING LINEAR VIBRATION AND ANGULAR VIBRATION BASED ON MONOCULAR VISION

CROSS-REFERENCE TO RELATED APPLICATIONS

This application claims the benefit of priority from Chinese Patent Application No. 202111350564.4, filed on Nov. 15, 2021. The content of the aforementioned application, including any intervening amendments thereto, is incorporated herein by reference in its entirety.

TECHNICAL FIELD

This application relates to vibration measurement and testing, and more particularity to a method for calibrating linear vibration and angular vibration based on monocular vision.

BACKGROUND

Linear and angular accelerometers have been widely used in the vibration measurement in various fields, such as pose estimation, inertial navigation, earthquake early warning, health monitoring of bridge and building, safety assessment of wind power and medical aided diagnosis. A sensitivity of the linear and angular accelerometers is generally regarded as a known parameter in the engineering application, and the measurement precision of the linear and angular accelerometers will directly affect the performance of actual engineering application systems or devices. With the increase in types and applications of the linear and angular accelerometers, in order to satisfy the rapidly growing requirements for high precision measurement in the engineering application, there is an urgent need to develop an effective and accurate method for calibrating the sensitivity of the linear and angular accelerometers.

At present, comparison method and absolute method are commonly used in the vibration calibration. The absolute method further includes laser interferometry and earth gravity method. In the comparison method, a linear and angular accelerometer to be calibrated and a reference linear and angular accelerometer are installed back-to-back on a work table of a vibration generating device, and the calibration is enabled according to outputs of the two linear and angular accelerometers and a sensitivity of the reference linear and angular accelerometer. The comparison method has simple operation, low cost, excellent flexibility and high efficiency. Unfortunately, the calibration precision is relatively low (about 1%). Compared to the comparison method, the laser interferometry is more frequently used for calibrating, which reproduces an exciting acceleration of a linear and angular accelerometer provided by a vibration generating device based on doppler velocity measurement and laser interferometry to calibrate the sensitivity. This method has a wide calibrating range (from 0.1 Hz to 20 kHz), but it struggles with expensive and complex measurement system, poor flexibility and cumbersome operation process. Moreover, the calibration precision of the laser interferometry will decline at low frequencies due to influences of speckle noise, weak collimation, bending of the guide rail of the excitation generator and so on. The earth gravity method utilizes the gravitational acceleration as an input excitation of the linear and angular accelerometer to perform the calibration, which is simple and convenient, but is limited by a limited frequency range (an upper limit frequency of less than 10 Hz).

Due to the simple operation, high flexibility and efficiency and low cost, a monocular vision-based calibration method has a promising application prospect in the linear and angular vibration measurement. Unfortunately, the exiting monocular vision method is merely suitable for the calibration of linear vibration.

In view of the defects of high cost, complex operation, poor flexibility, low precision and poor efficiency in the existing methods for calibrating a linear and angular accelerometer, the present disclosure provides an efficient, flexible and economical calibration method, which is capable of reproducing the exciting acceleration of the linear and angular accelerometer based on monocular vision, achieving the efficient and reliable calibration of the linear and angular accelerometer.

SUMMARY

In order to overcome the problems of high cost, complex operation, poor flexibility, limited calibration frequency range and poor precision in the existing method for calibrating a linear and angular accelerometer, the present disclosure provides an efficient, flexible and reliable method for calibrating linear vibration and angular vibration.

Technical solutions of the disclosure are described as follows.

This application provides a method for calibrating linear vibration and angular vibration based on monocular vision, comprising:

(S1) simultaneously installing a feature mark and a linear and angular accelerometer to be calibrated on a work table of a linear-angular vibration generating device; acquiring, by an industrial camera, a motion sequence image of the feature mark; and acquiring, by a data acquisition card, an output signal of the linear and angular accelerometer;

(S2) determining a correspondence matrix between a pixel coordinate and a world coordinate by a camera calibration method; extracting a line edge coordinate of the motion sequence image of the feature marker by using an edge extraction method based on line segment detector; obtaining a corresponding fitted edge line by fitting the line edge coordinate based on least squares; and obtaining an excitation acceleration of the linear and angular accelerometer;

(S3) fitting the exciting acceleration of the linear and angular accelerometer measured by a monocular vision method and the output signal of the linear and angular accelerometer, respectively, by a sine approximation method; and solving an overdetermined system to obtain a fitted peak of the exciting acceleration and a fitted peak of the output signal, wherein the overdetermined system is formed by a plurality of sampling moments and a plurality of exciting accelerations or a plurality of output signals respectively corresponding to the plurality of sampling moments; and (S4) calculating a sensitivity of the linear and angular accelerometer by calculating a ratio of the fitted peak of the output signal to the fitted peak of the excitation acceleration according to an International Standard ISO 16063-1.

Compared to the prior art, this application has the following beneficial effects.

(1) The method provided herein is stable, reliable and practical, which is suitable for the calibration of a linear and angular accelerometer within different frequency and amplitude ranges.

(2) The method provided herein is simple, flexible and low-cost, which only requires one vision measurement device for the calibration of the linear and angular accelerometer.

(3) The method provided herein can calibrate a sensitivity of the linear and angular accelerometer efficiently and reliably by a high-precision measurement of linear vibration and angular vibration.

(4) The method provided herein is a vibration calibration method, which can calibrate linear and angular accelerometers with different models and manufacturers within a certain frequency range.

(5) The method provided herein can simultaneously measure a linear exciting acceleration and an angular exciting acceleration by the monocular vision method, which facilitates the traceability of the calibration of the linear and angular accelerometer, and also facilitates unifying the linear and angular vibration measurement system.

DETAILED DESCRIPTION OF EMBODIMENTS

In order to overcome the problems of high cost, complex operation, poor flexibility and limited calibration frequency range and capacity in the existing methods for calibrating the linear and angular accelerometer, the present disclosure provides a method for calibrating linear vibration and angular vibration based on monocular vision. The method provided herein can achieve the efficient, flexible, accurate and reliable measurement of linear vibration and angular vibration, so as to precisely calibrate a sensitivity of the linear and angular accelerometer. The disclosure will be clearly and completely described below with reference to the accompanying drawings and embodiments.

Figure 1:
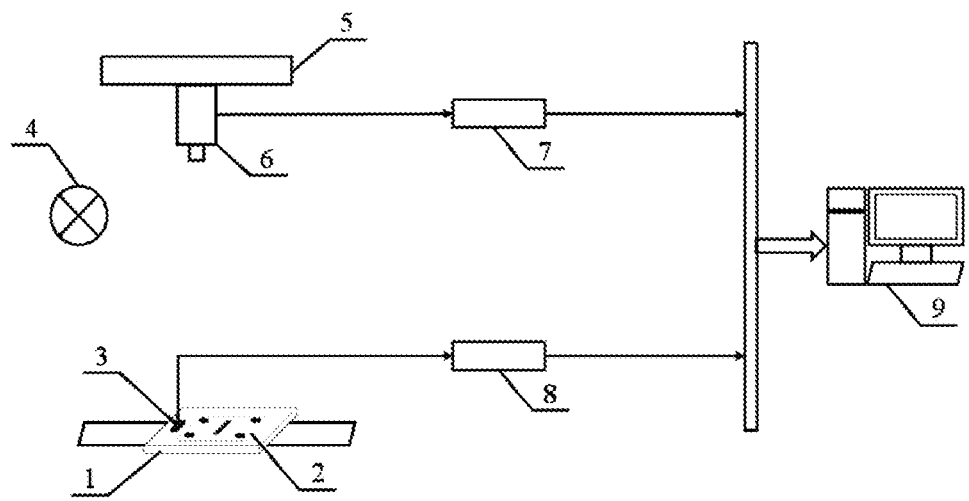
FIG. 1 schematically depicts an apparatus of calibrating linear vibration according to an embodiment of the present disclosure.
Figure 2:
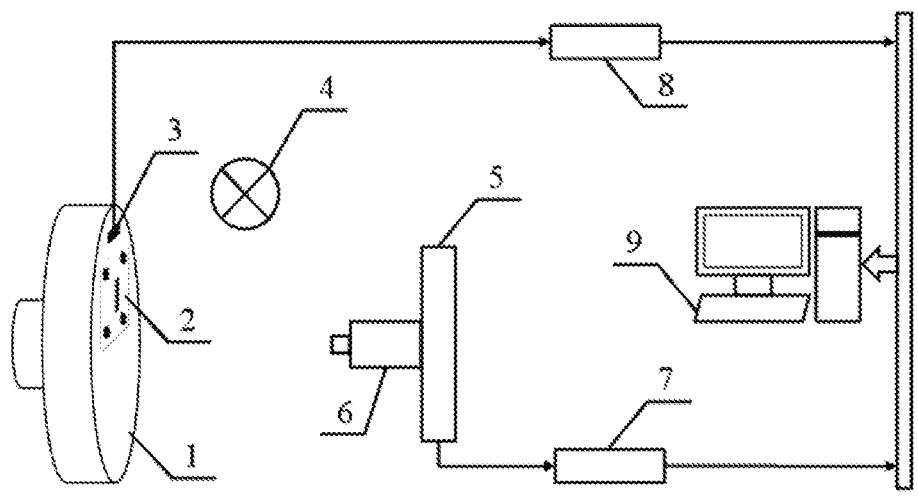
FIG. 2 schematically depicts an apparatus of calibrating angular vibration according to an embodiment of the present disclosure.

As shown in FIGS. 1 and 2, an apparatus for implementing the method for calibrating linear vibration and angular vibration based on monocular vision includes a work table of a linear-angular vibration generating device 1, a feature mark 2, a linear and angular accelerometer 3, a lighting device 4, a fixing device 5, an industrial camera 6, a sequence image transmission device 7, a voltage signal acquisition and transmission device 8 and an image and signal processing and displaying unit 9. The industrial camera 6 is connected to the sequence image transmission device 7. The voltage signal acquisition and transmission device 8 is connected to the image and signal processing and displaying unit 9.

The work table of the linear-angular vibration generating device 1 is configured to generate a linear and angular exciting acceleration. The feature mark 2 and the linear and angular accelerometer 3 are fixedly arranged on the work table of the linear-angular vibration generating device, such that a vibration characteristic of the feature mark 2 is consistent with that of the linear and angular accelerometer 3. The lighting device 4 is configured to provide light for the industrial camera 6. The fixing part 5 is configured to fix the industrial camera 6 to allow an optical axis of the industrial camera 6 to be perpendicular to the feature mark 2. The industrial camera 6 is configured to collect a motion sequence image of the feature mark 2. The sequence image transmission device 7 is configured to transmit the motion sequence image of the feature mark 2 acquired by the industrial camera 6. The voltage signal acquisition and transmission device 8 is configured to collect and transmit an output voltage signal of the linear and angular accelerometer 3. The image and signal processing and displaying unit 9 is configured to process the motion sequence image and the voltage signal collected by the voltage signal acquisition and transmission device 8, and save and display a calibration result of the sensitivity of the linear and angular accelerometer 3.

Figure 3:
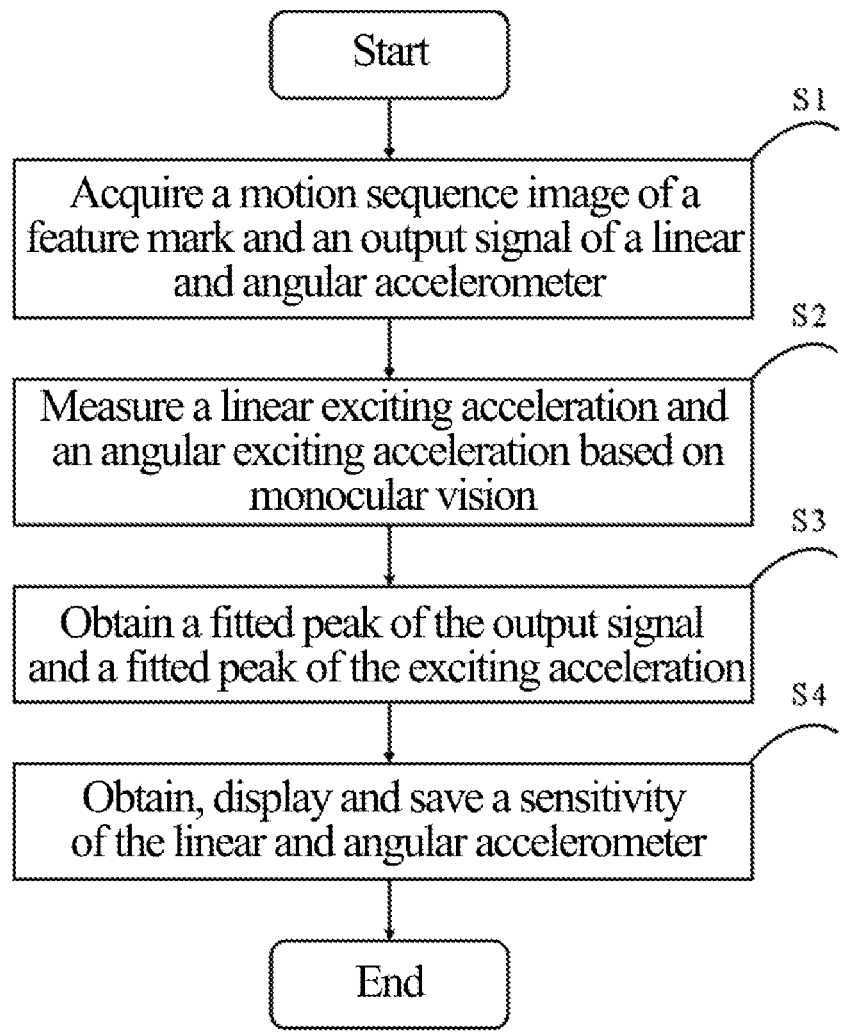
FIG. 3 is a flow chart of a method for calibrating linear vibration and angular vibration based on monocular vision.

As shown in FIG. 3, the method for calibrating linear vibration and angular vibration based on monocular vision is specifically described as follows.

(S1) A feature mark and a linear and angular accelerometer to be calibrated are simultaneously installed on a work table of a linear-angular vibration generating device, such that a vibration characteristic of a line of the feature mark is consistent with a vibration characteristic of the linear and angular accelerometer. A motion sequence image of the feature mark is acquired by an industrial camera. An output signal of the linear and angular accelerometer is acquired by a data acquisition card.

(S2) A correspondence matrix between a pixel coordinate and a world coordinate is determined by a camera calibration method. A sub-pixel of a line edge of the motion sequence image of the feature mark is extracted by using an edge extraction method based on line segment detection.

(S3) An exciting acceleration of the linear and angular accelerometer measured by a monocular vision method and the output signal of the linear and angular accelerometer are fitted, respectively, by a sine approximation method. An overdetermined system is solved to obtain a fitted peak of the exciting acceleration and a fitted peak of the output signal, where the overdetermined system is formed by a plurality of sampling moments and a plurality of exciting accelerations respectively corresponding to the plurality of sampling moments.

(S4) A sensitivity of the linear and angular accelerometer is to be calculated according to the fitted peak of the output signal and the fitted peak of the exciting acceleration, and a calculated sensitivity of the linear and angular accelerometer is saved and displayed.

the sensitivity of the linear and angular accelerometer is defined as a ratio of the fitted peak of the output signal to the fitted peak of the exciting acceleration, expressed as follows:

$$S_{mag}=u_p/a_p;$$

where $S_{mag}$ is the sensitivity of the linear and angular accelerometer defined by ISO 16063-1.

Specific parameters of the apparatus provided herein are described as follows. A frequency range of a linear vibration bench is 0.01-100 Hz. A maximum linear displacement of the linear vibration bench is 400 mm. A frequency range of an angular vibration bench is 0.001-10 Hz. A maximum angular displacement of the angular vibration bench is 360°. The feature marker is a metal plate, where the metal plate is made of four circles with a radius of 15 mm surrounding a straight line with a length of 60 mm and a width of 0.5 mm. A model of the industrial camera is IDT OS10-V3-4K. A maximum resolution of the industrial camera is 9 megapixels and a maximum number of frames thereof is 1000 fps. A lens of the industrial camera is a KOWA lens with a focal length of 16 mm. The lighting device is an incandescent lamp with a power of 60 W.

Figure 4:
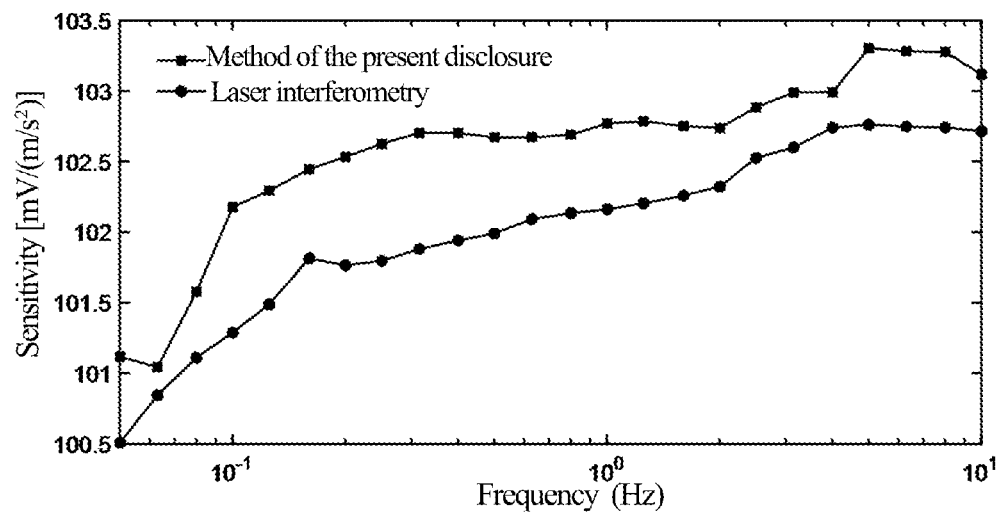
FIG. 4 illustrates a calibration result of sensitivity of a linear accelerometer according to an embodiment of the present disclosure.
Figure 5:
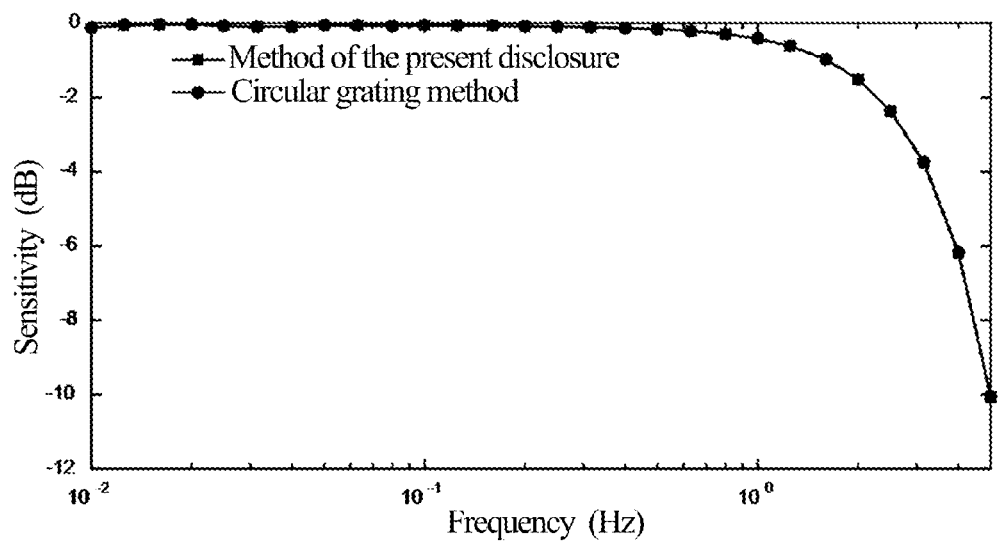
FIG. 5 illustrates a calibration result of sensitivity of an angular accelerometer according to an embodiment of the present disclosure.

In order to verify a precision of the method herein, a linear accelerometer is calibrated at a frequency range of 0.05-10 Hz, and a angular accelerometer is calibrated at a frequency range of 0.01-5 Hz. FIG. 4 illustrates a result of calibrating sensitivity of the linear accelerometer by the method of this disclosure and a laser interferometry respectively. FIG. 5 illustrates a result of calibrating sensitivity of the angular accelerometer by the method of this disclosure and a circular grating method respectively. As shown in FIGS. 4 and 5, results of calibrating in the method of the disclosure, the laser interferometry and the circular grating method are similar. In the frequency range of 0.05-10 Hz, a maximum relative deviation between the method of this disclosure and the laser interferometry is 0.878%. In the frequency range of 0.01-5 Hz, a relative deviation between the method of this disclosure and the circular grating method is less than 0.546%.

Described above are merely illustrative of the present disclosure, and are not intended to limit the present disclosure. It should be noted that any improvements, variations and modifications made by those skilled in the art without departing from the scope of the disclosure shall fall within the scope of the present disclosure defined by the appended claims.

What is claimed is:

1. A method for calibrating linear vibration and angular vibration based on monocular vision, comprising:
(S1) installing a feature mark and a linear and angular accelerometer to be calibrated on a work table of a linear-angular vibration generating device, such that a vibration characteristic of a line of the feature mark is consistent with a vibration characteristic of the linear and angular accelerometer; acquiring, by an industrial camera, a motion sequence image of the feature mark; and acquiring, by a data acquisition card, an output signal $u(t_i)$ of the linear and angular accelerometer;
(S2) measuring an excitation acceleration $a(t_j)$ of the linear and angular accelerometer, comprising:
determining a correspondence homography matrix H between an actual pixel coordinate and a world coordinate, comprising:
selecting an X corner point of a checkerboard target image as a feature point; and acquiring a location coordinate of the X corner point by utilizing a sub-pixel corner point positioning method;
solving the homography matrix H by a projection model, expressed as follows:

$$\begin{bmatrix} x_d \\ y_d \\ 1 \end{bmatrix} = H \begin{bmatrix} x_w \\ y_w \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x_w \\ y_w \\ 1 \end{bmatrix}; \qquad (1)$$

wherein $(x_d, y_d)$ is an actual pixel coordinate of a point P and $(x_w, y_w)$ is a world coordinate of the point P; and the H is configured to enable conversion between the actual pixel coordinate and the world coordinate;

obtaining a coefficient of a second-order radial distortion based on a polynomial model by a least squares-based nonlinear optimization; and
plugging a pixel coordinate optimized by a distortion and a corresponding world coordinate into equation (1) to obtain the H;
extracting a sub-pixel of a line edge of the motion sequence image of the feature mark by extracting a sub-pixel coordinate of points on the line edge of the motion sequence image; and merely retaining a feature edge in a motion direction according to a constraint on the number of edge points of the line edge; and
converting a detected sub-pixel coordinate of an edge point to the corresponding world coordinate by the H; obtaining a corresponding fitted edge line based on least squares fitting; obtaining a linear and angular displacement $d(t_j)$ corresponding to an image edge at a sampling moment through the corresponding fitted edge line; wherein considering that an excitation signal of the linear and angle vibration generation device is sine, a corresponding exciting acceleration $a(t_j)$ is expressed as follows:

$$a(t_j)=\omega_v^2 d(t_j) \qquad (2);$$

wherein $\omega_v$ is an angular frequency of vibration;
(S3) fitting the exciting acceleration $a(t_j)$ of the linear and angular accelerometer and the output signal $u(t_i)$ of the linear and angular accelerometer, respectively, by a sine approximation method; and solving an overdetermined system to obtain a fitted peak $a_p$ of the exciting acceleration $a(t_j)$ and a fitted peak $u_p$ of the output signal $u(t_i)$, wherein the overdetermined system is formed by a plurality of sampling moments $t_j$ and a plurality of exciting accelerations $a(t_j)$ respectively corresponding to the plurality of sampling moments $t_j$; and
(S4) calculating a sensitivity of the linear and angular accelerometer according to the fitted peak $u_p$ of the output signal $u(t_i)$ and the fitted peak $a_p$ of the exciting acceleration $a(t_j)$; and saving and displaying a calculated sensitivity of the linear and angular accelerometer.

2. The method of claim 1, wherein the sine approximation method with four parameters for fitting the exciting acceleration $a(t_j)$ of the linear and angular accelerometer and the corresponding sampling moment $t_j$ is expressed as follows:

$$a(t_j)=A_v \cos(\omega_v t_j)-B_v \cos(\omega_v t_j)+C_v t_j+D_v \qquad (3);$$

wherein $A_v$ and $B_v$ are components of the exciting acceleration $a(t_j)$; $C_v$ is a disturbance variable; and $D_v$ is an offset;
parameters $A_v$, $B_v$, $C_v$ and $D_v$ are obtained by solving an overdetermined system formed by N sampling moments $t_j$ and corresponding exciting accelerations $a(t_j)$, wherein the overdetermined system is expressed as equation (3);
parameters $A_u$, $B_u$, $C_u$ and $D_u$ are obtained by solving an overdetermined system expressed as equation (4), wherein the overdetermined system (4) is formed by a sampling moment $t_i$ and the output signal $u(t_i)$ of the linear and angular accelerometer:

$$u(t_i)=A_u \cos(\omega_v t_i)-B_u \cos(\omega_v t_i)+C_u t_i+D_u \qquad (4); \text{ and}$$

the fitted peak $u_p$ of the output signal $u(t_i)$ and the fitted peak $a_p$ of the exciting acceleration $a(t_j)$ are obtained, respectively expressed as follows:

$$\begin{cases} a_p = \sqrt{A_v^2 + B_v^2} \\ u_p = \sqrt{A_u^2 + B_u^2} \end{cases} \quad (5)$$

3. The method of claim 1, wherein the sensitivity of the linear and angular accelerometer is defined as a ratio of the fitted peak $u_p$ of the output signal $u(t_i)$ to the fitted peak $a_p$ of the exciting acceleration $a(t_j)$, expressed as follows:

$$S_{mag} = u_p/a_p \quad (6);$$

wherein $S_{mag}$ is the sensitivity of the linear and angular accelerometer.

4. An apparatus for implementing the method of claim 1, comprising:
the work table of the linear-angular vibration generating device;
the feature mark;
the linear and angular accelerometer;
a lighting device;
a fixing part;
the industrial camera;
a sequence image transmission device;
a voltage signal acquisition and transmission device; and
an image and signal processing and displaying unit;
wherein the industrial camera is connected to the sequence image transmission device; and the voltage signal acquisition and transmission device is connected to the image and signal processing and displaying unit; the work table of the linear-angular vibration generating device is configured to generate the exciting acceleration; the feature mark and the linear and angular accelerometer are fixedly arranged on the work table of the linear-angular vibration generating device, such that the vibration characteristic of the feature mark is consistent with that of the linear and angular accelerometer; the lighting device is configured to provide light for the industrial camera; the fixing part is configured to fix the industrial camera to allow an optical axis of the industrial camera to be perpendicular to the feature mark; the industrial camera is configured to collect the motion sequence image of the feature mark; the sequence image transmission device is configured to transmit the motion sequence image of the feature mark acquired by the industrial camera; the voltage signal acquisition and transmission device is configured to collect and transmit the output signal of the linear and angular accelerometer; and the image and signal processing and displaying unit is configured to process the motion sequence image and the output signal collected by the voltage signal acquisition and transmission device, and save and display a calibration result of the sensitivity of the linear and angular accelerometer.

* * * * *